United States Patent Office 3,426,853
Patented Feb. 11, 1969

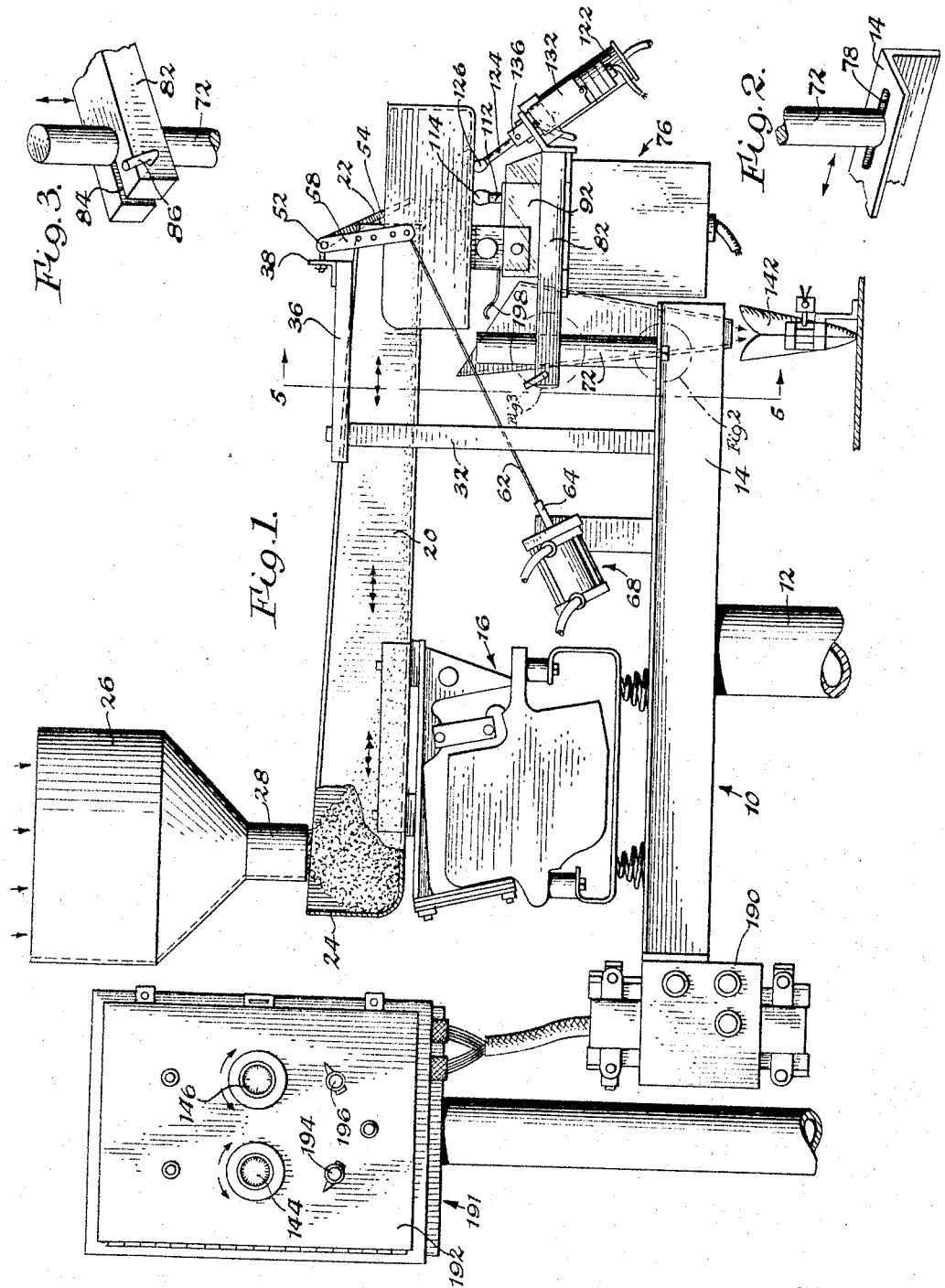

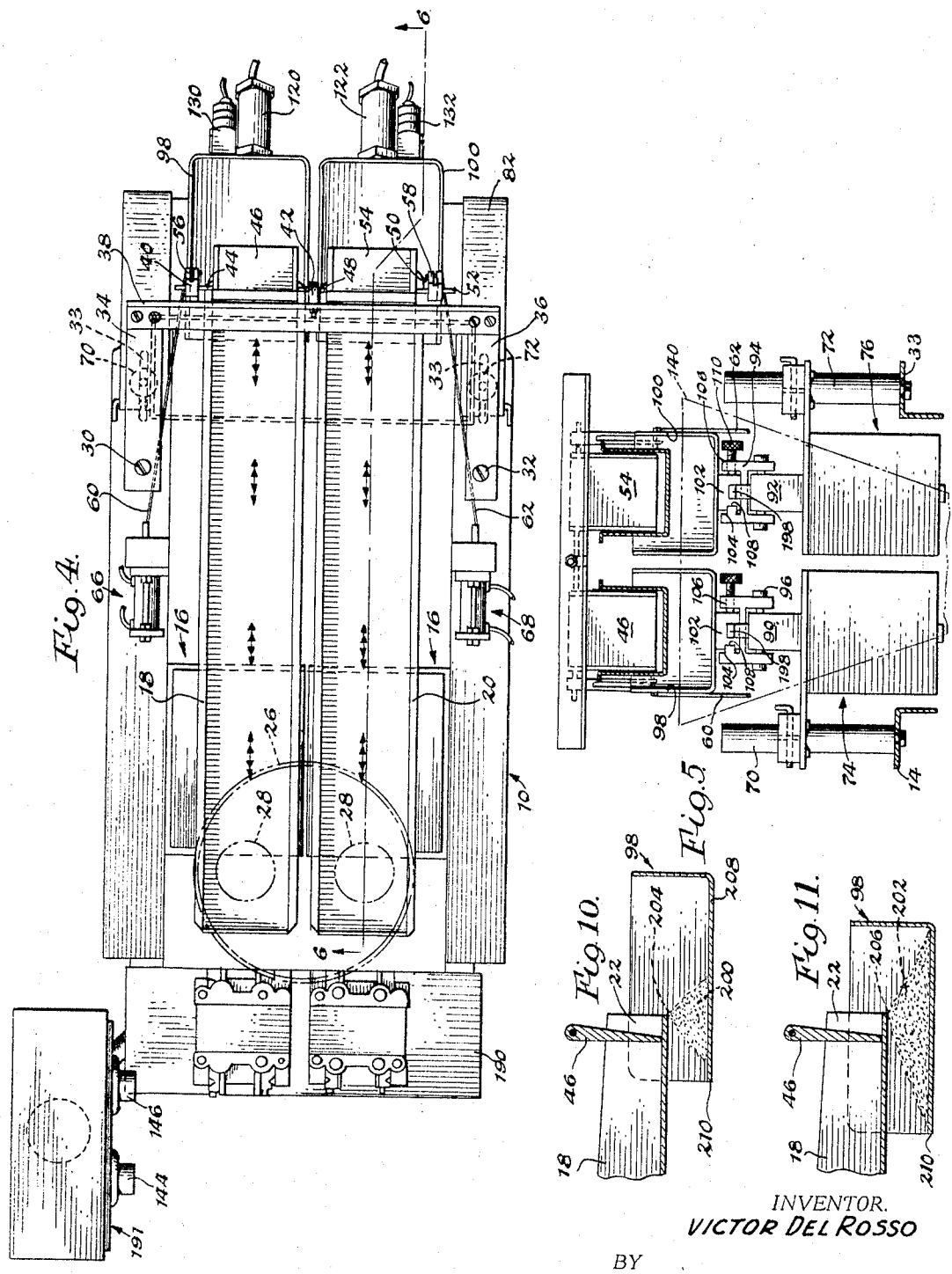

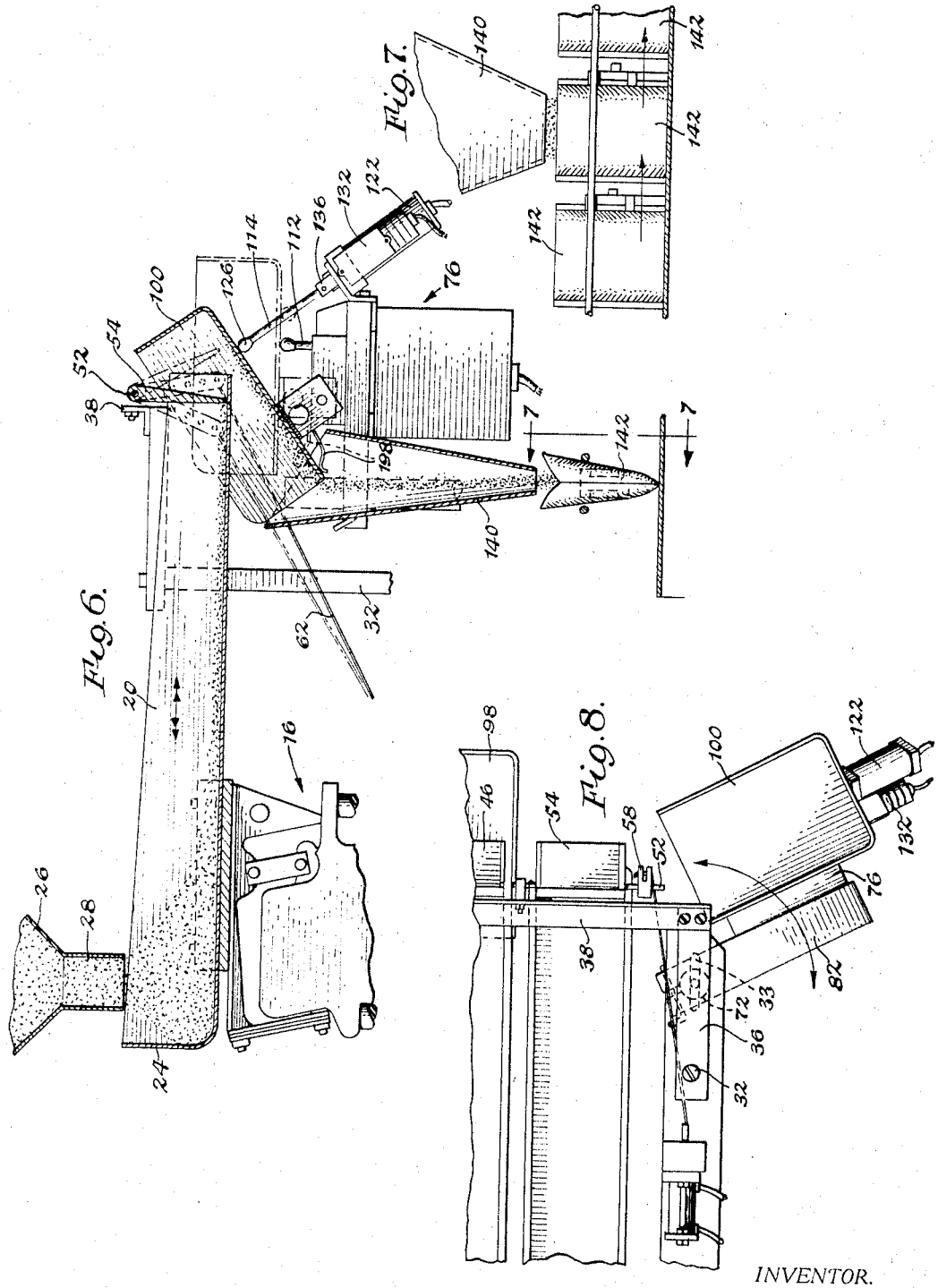

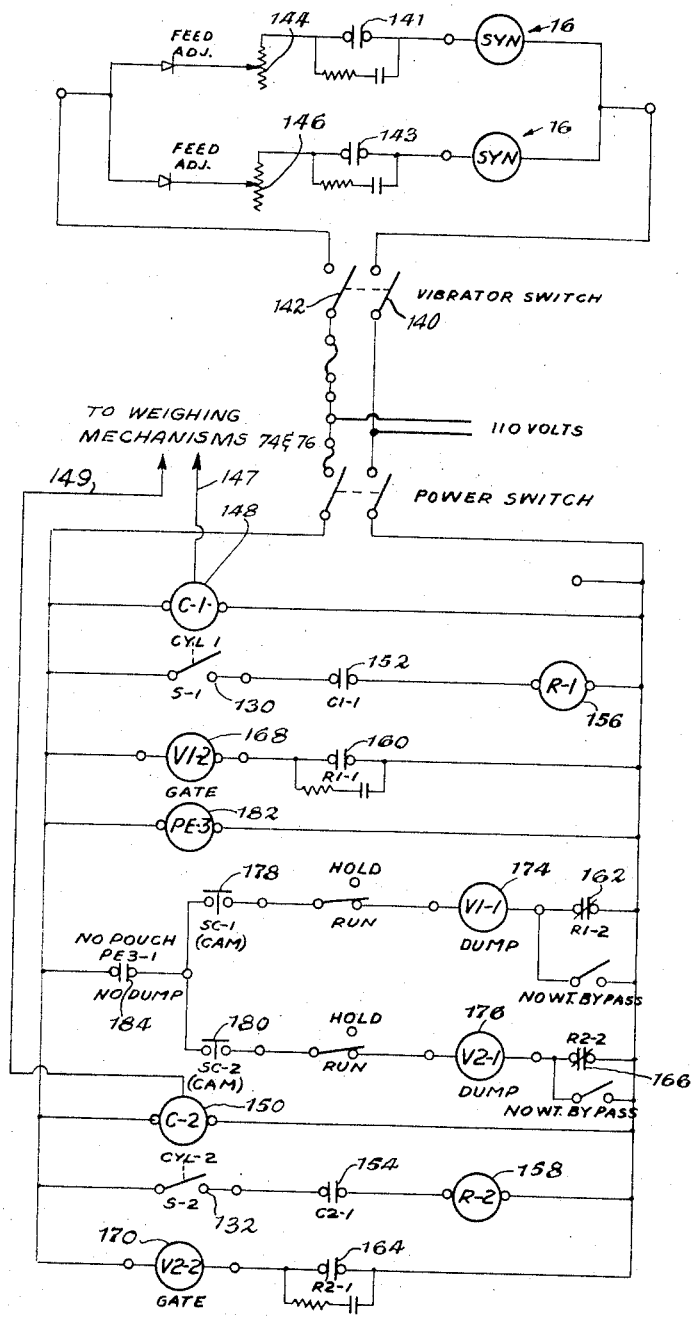

3,426,853
HORIZONTAL VIBRATORY DISPENSER WITH WEIGHING AND TILTING DISCHARGER
Victor Del Rosso, 138 Bundy Road, Ithaca, N.Y. 14850
Continuation-in-part of application Ser. No. 470,462, July 8, 1965. This application Feb. 2, 1968, Ser. No. 704,504
U.S. Cl. 177—103
Int. Cl. G01g *13/02, 13/22*

10 Claims

ABSTRACT OF THE DISCLOSURE

A weighing pan having a smooth and unobstructed interior mounted for tilting movement between a material-receiving position and a dumping position so that cyclic operation may be effected by relatively lightweight mechanism, product buildup is avoided, and the movement of the material during dumping is a pouring, self-cleaning action. Further, the weighing pan is adjustably mounted for vertical movement toward the material feeding apparatus so as to minimize the amount of material which is not sensed by the weighing pan at the time of feed cutoff but which nevertheless ultimately reaches the weighing pan and thereby contributes to the net weight of material on the pan.

Cross reference to related application

This application is a continuation-in-part of my co-pending application Ser. No. 470,462 filed July 8, 1965, entitled, Net Weigher.

Background of the invention

In the net weighing art wherein particulate material is fed automatically in batch fashion, the dictates of rapidity of operation require that the feeding and weighing operations be accomplished as rapidly as possible. With rapid feeding there is a great likelihood that the automatic mechanism controlling the feed cutoff at some predetermined weight less than the desired weight must be adjusted so as to leave a substantial quantity of material which flows after the signal for cutoff. If materials were uniform in density and flow characteristics throughout successive weighing operations, there would be no problem but such is not the case, both the flow characteristics and the density of a material are likely to vary and, as a result, the weight of a material which continues to flow subsequent to the signal for cutoff and which ideally would be of just exactly that weight necessary to bring the total weight up to the predetermined desired value may vary substantially from batch to batch such that uniformity in batch weights is not attained.

Moreover, in weighing systems wherein successive batches of material are rapidly to be formed, conventional accumulating devices which later in the cycle dump the batch into a suitable container tend to create problems. Many of these accumulating devices are of hopper-like configuration with a controllable discharge gate. The problem of product buildup in such devices is very great. That is to say, both the nature of the dumping action and the requirement for a moldable gate and mounting mechanism thereof tend to be conducive to the building up of pockets or masses of material which are not dumped and this of course causes error in batch weights. Moreover, the prior art dumping arrangements for the batch are ordinarily rather heavy and cumbersome, are difficult to mount and to dismount for cleaning or replacement and are required to be provided with relatively heavy actuating mechanism for rapidly opening and closing the gate.

Brief summary of the invention

One aspect of the present invention relates to an improved form of weighing pan or batch accumulator in which the weighing pan is mounted for tilting-dumping action. By this means the mounting arrangement for the weighing pan is simplified greatly, it is characterized by low inertia allowing simple and lightweight mechanism for actuating it and also allowing the weighing pan easily to be removed and replaced, it provides a novel dumping action in which the product is poured or flowed rather than being dumped in a mass, and it allows the interior of the weighing pan to be smooth so that in conjunction with the aforesaid pouring or flowing action during dumping substantially eliminates any tendency for product buildup.

Another aspect of the present invention involves a net weighing apparatus utilizing a weighing mechanism including a weighing pan, a material feed device having a discharge mouth disposed above the weighing pan and a gate for selectively closing the discharge mouth in response to a predetermined weight of material in the weighing pan less than the net weight desired, and means for varying the vertical spacing between the discharge mouth and the weighing pan to minimize the quantity of flowing material between such discharge mouth and material piled on and supported by the weighing pan when the gate is closed.

A further aspect of the present invention involves a net weighing system including a pair of weighing mechanisms disposed in side-by-side relation each including a weighing pan and means for selectively dumping the weighing pan, a common hopper for receiving material dumped from the weighing pans, a pair of material feed devices having discharge mouths disposed above respective weighing pans and means for preventing simultaneous dumping of the pans.

Another aspect of the present invention involves a net weighing apparatus including side-by-side weighing pans and individual feed means for such pans, and a single support post for each weighing pan allowing both pivotal and vertical adjustment of the weighing pans.

Brief description of the figures of the drawing

FIG. 1 is a side elevational view, partly broken away, showing the arrangement of the component parts of the weighing mechanism according to the present invention;

FIG. 2 is a perspective view showing details of the mounting post for the weighing mechanism;

FIG. 3 is a perspective view showing details of the manner in which the weighing mechanism is secured to the supporting post therefor;

FIG. 4 is a plan view of the assembly shown in FIG. 1;

FIG. 5 is a vertical section taken substantially along the plane of section line 5—5 in FIG. 1 showing details of the weighing pan support and mounting mechanism;

FIG. 6 is a vertical longitudinal section taken substantially along the plane of section line 6—6 in FIG. 4;

FIG. 7 is a vertical section taken generally along the plane of section line 7—7 in FIG. 6 illustrating the feed hopper and the container conveying mechanism disposed therebelow;

FIG. 8 is a plan view of the mechanism showing one of the scale devices swung to an out-of-the-way position;

FIG. 9 is a circuit diagram of the control mechanism associated with the present invention; and FIGS. 10 and 11 are partial sectional views illustrating the arrangement of component parts for weighing different types of material.

Detailed description of the invention

With reference now more particularly to FIG. 1, the reference character 10 therein indicates generally a frame or base for the machine and which may be supported at suitable elevated positions with respect to the floor surface by means of a suitable post 12 or the like. The frame 10 includes the side rails 14 which mount a vibrating mechanism indicated generally by the reference character 16 adjacent to one end of the frame. The vibrating mechanism itself forms no part of the present invention and the details thereof may be as described in Patent No. 2,895,064. Suffice it to say that the vibrating mechanism 16, of which there are two such assemblies as may be seen in FIG. 4, are respectively adapted to impart longitudinal reciprocatory motion independently to the two feeding troughs 18 and 20. Each of the troughs is provided with an open end 22, defining a discharge mouth the opposite end 24 being closed as shown and a suitable supply or feed to the troughs 18 and 20 is provided, such as by means of a hopper device 26 having individual discharge spouts 28 discharging to the troughs 18 and 20.

A pair of support posts 30 and 32 are secured at their lower ends to the respective side rails 14 and their upper ends have secured thereto the trailing arms 34 and 36 connected at their free ends by cross bar member 38 substantially as is shown. The cross bar 38 carries a pair of ears 40 and 42 rotatably supporting a shaft 44 to which a gate 46 for the trough 18 is affixed, and a further pair of ears 48 and 50 rotatably supporting a shaft 52 to which the gate 54 for the trough 20 is secured. An actuating arm 56 is secured to the shaft 44 and a similar actuating arm 58 is secured to the shaft 52, each of such actuating arms being disposed in depending relationship substantially as is shown in FIG. 1 for the arm 58 by means of which the respective gate is controlled. Links 60 and 62 extend from the respective arms 56 and 58 for connection to the plungers 64 of pneumatically operated cylinder assembly 66 and 68 which are mounted on the respective side rails 14 of the machine. The manner in which these cylinders 66 and 68 are controlled will be more particularly described hereinafter.

Each side rail carries a single post 70 and 72 for supporting its associated weighing mechanism 74 or 76, see particularly FIG. 5. Each side rail 14 is slotted as indicated by the reference character 78 in FIG. 2 to permit of longitudinal adjustment of the respective post 70 or 72 for purposes which will be presently apparent. Each weighing mechanism 74 or 76 has an arm 80 or 82 which is bifurcated as at 84 at its free end as shown in FIG. 3 and provided with an opening to receive its respective post 70 or 72. The bifurcated portion is adapted to releasably clamp upon the associated post 70 or 72 under the action of an L-shaped set-screw member 86 in each case. In this way, the vertical adjustment of the weighing mechanisms 74 and 76 may be accomplished the purpose of which will be presently apparent, and, additionally, as will be seen, this manner of mounting permits the weighing mechanisms to be individually swung out of the way to be readily accessible for cleaning, repair or the like.

As may be seen more clearly in FIG. 5, each weighing mechanism includes a weight sensitive plunger 90 or 92 which pivotally carries an H-section member 94 by means of a pivot shaft 96 substantially as is shown and which releasably carries the associated weighing pan 98 or 100. Each weighing pan is provided with a fixed, depending mounting tab 102 received between the upper ends 104 and 106 of a respective H-member 94 and a suitable tongue and groove arrangement 108 is preferably provided so as to locate and readily permit the associated weigh pan to be quickly and easily disassembled from the member 94, a suitable knurled set-screw member 110 being provided to normally hold the weigh pan in proper position on the member 94. Each plunger 90 or 92 also carries a support rod 112 having a rubber tip 114 adapted to engage the underside of the associated weigh pan 98 or 100 and normally hold the same in level position substantially as is shown in FIGS. 1 and 6.

Each of the weighing mechanisms carries a pneumatic cylinder 120 or 122 substantially as is shown in FIGS. 1 and 4 and each includes a plunger rod 124 having a rubber tip 126 engaging the undersurface of the respective weigh pan 98 or 100. When actuated in the manner hereinafter more particularly described, the respective cylinders 120 or 122 are adapted to tip the weigh pans in the manner illustrated in FIG. 6. Associated with each of the cylinders 120 and 122 are the switch mechanisms 130 and 132, each of which has an actuating finger portion 136, see FIGS. 1 and 6, which are adapted to be actuated by the bulbous plunger tips 126 to control the respective switches 130 and 132 for purpose hereinafter more particularly pointed out.

As will be seen, the weigh pans 98 and 100 are interlocked by their controls so that they cannot be simultaneously dumped inasmuch as they feed to a common hopper member 140 which, in turn, feeds the receptacles 142 or containers for the bulk particulate material. As is shown in FIG. 7, a series of containers 142 may be mounted for step-by-step movement past the discharge end of the hopper or funnel 140, the control and manner in which the containers 142 are moved forming no part of the present invention.

From the aforesaid description, it will be readily apparent that each weighing mechanism in its entirety is mounted as a single unit which derives a single point of support, from its respective post 70 or 72. In this fashion, each weighing mechanism may be adjusted vertically so that the weighing pan 98 or 100 thereof is at a desired distance from the discharge end 22 of its respective conveying trough 18 or 20. Also, this particular manner of mounting permits each weighing mechanism to be swung to an out-of-the-way position as it shown in FIG. 8 for cleaning, repair or other servicing. The longitudinal adjustment of the post as shown in FIG. 2 and particularly the vertical adjustments of the weighing mechanism is extremely important insofar as attaining accuracy of weighing is concerned. That is to say, it will be readily appreciated that various types of bulk particulate material and different net weights thereof will effect different heights of material in the weigh pan at the particular weight involved. Thus, in any given circumstance, the weigh pan can be adjusted very close to the discharge end 22 of the respective conveying trough 18 or 20 so that when the net weight of the material is approached, the top of the material pile will be very close to the discharge end of the trough so that very little material will be in "suspension" when the feed is terminated and the gate closed. This, in turn, minimizes the possibility for inaccurate weighing as a result of a large mass of material being in suspension as a aforesaid.

With reference now to FIG. 9, the operation of the device will be described in conjunction therewith. As shown, the vibratory feeders 16 are energized by normally closed switches 140 and 142 respectively, each of which is in series with a rheostat 144 or 146, the rheostats being adjustable to affect the speed of feeding. One of the weighing mechanisms 74 provides an electrical signal which is applied via conductor 147 to the control amplifier 148 and the other scale mechanism 76 energizes the control amplifier 150 via conductor 149. These amplifiers 148 and 150 respectively control the normally closed switches 152 and 154 respectively. The switches 152 and 154 are, as stated, normally closed in response to an underweight condition on the respective weighing pans. The switches 130 and 132 controlled by the dumping cylinders 120 and 122 are in series with respective switches 152 and 154 and are normally closed in the non-dumping position. This condition of the circuitry, that is with the switches 130 and 152 as well as the switches 132 and 154 normally closed, energizes the respective relays 156 and 158, each of which controls three switches. The relay 156 controls the previously mentioned switch 140 so that the same is normally closed, when the relay is energized and normally closes the switch 160 and normally opens the switch 162. Similarly, the relay 158 controls the switch 142 so as to be normally closed, normally closes the switch 164 and normally opens the switch 166. In these conditions of the circuitry, the vibratory feeders are feeding both weighing pans and product is being fed thereto. At the same time, the solenoids 168 and 170 which control the valves to maintain the gate in open position are energized, by the normally closed switches 160 and 164 respectively. As soon as a predetermined weight condition is sensed by the scale mechanisms, one or the other or both of the amplifiers 148 and 150 produce an output sufficient to open the normally closed switches 152 or 154, thus deenergizing the respective relays 156 and 158 which, in turn, open the respective switches 140 or 142, open the respective switches 160 or 164 and close the respective switches 162 or 166. The effect is to shut off the associated vibratory feeder, close the associated gate and prepare the mechanism for dumping. The dumping in each case is controlled by the switch 162 or 166 when closed and these respective switches control actuation of the solenoids 174 and 176 which operate the dumping cylinders 120 or 122 as the case may be. These switches 162 and 166 and their respective solenoids 174 and 176 will be seen to be in parallel and are provided with switches 178 and 180 which are alternately closed so that only one or the other of the circuits may dump at a given time. At the same time, a photoelectric device 182 controls a switch 184 so that the switch 184 is closed only when a container is in a position beneath the common discharge hopper or funnel 140 previously mentioned. Thus, the dumping action can only take place when a container is in position beneath the funnel 140 and the switches 178 and 180 which may be cam controlled or otherwise provided to be alternately closed assures that only one of the weigh pans can be dumped. The switches 130 and 132 assure that a false weight indication which might otherwise close the switches 152 and 154, due to an underweight condition, may not occur during the dumping operation and thus prepares the circuitry for operation only when weighing pans are in the proper or horizontal position.

As may be seen in FIG. 1, an electrical terminal box 191 is mounted on the frame 10 and is connected to a control box assembly indicated generally by the reference character 190. The front panel 192 of the control box is provided with manual controls for the potentiometers or rheostats 144 and 146 for controlling the speed of the vibratory feeders 16, substantially as is shown and as indicated in FIG. 9, and the panel is also provided with control knobs 194 and 196 which control the gains of the amplifiers 148 and 150 so that the level at which the relays 156 and 158 are deenergized by opening the respective switches 152 and 154 is adjustable. To assure that the weighing pans 98 and 100 assume their normal or horizontal position, spring finger elements 198 are mounted on their respective plungers 90 and 92 to be engaged by the weigh pans when in a dump position so that when the dumping cylinder plungers are retracted, the spring 198 will assure that the weigh pans are returned to the horizontal position.

FIGS. 10 and 11, to which reference is now had, illustrate important principles of the present invention. These two figures show piles 200 and 202 of different types of materials but which for the purpose of remonstrating some of the problems in this art, will be assumed to be of substantially identical weights. The large difference in volumes of the two piles, even though of the same weight, may be due to differences in specific gravity, particle size, particle shape or a combination of these factors. It will also be noted that a substantial difference in angles of repose for the two materials is shown in these figures. All of these factors, or any one or a combination thereof, in addition to the factor of the net weight being dealt with, may be encountered. The present invention, as these figures illustrate, easily deals with all of these variables while still allowing extreme accuracy to be achieved.

By way of explanation, it will be seen that in both FIG. 10 and FIG. 11, the apices 204 and 206 of the piles 200 and 202 are located very close to the discharge mouth 22 of the feed device 18. However, it is to be noted that it is the vertical adjustments permitted of the weighing device which allows this relationship to prevail. It is to be understood that each pile represents that volume of material which constitutes the weight of material necessary to cause closing of the gate 46 to abruptly cease material feed action. Thus, there will be very little material "in suspension" when the material feed ceases and, as a consequence, a very minimal amount of material will be added to the piles 200 and 202 after material feed ceases which was not weighed by the weighing mechanism. This is true in both cases (FIGS. 10 and 11) despite the fact that the heights of the piles, at or near net weight, are substantially different.

In both FIGS. 10 and 11, it will be seen that the weighing pan presents a substantially horizontal floor 208 disposed below the discharge mouth 22 and positioned vertically and horizontally with respect thereto such that a batch of material of predetermined weight will pile on the floor without spreading to the free edge 210 thereof but will attain a height very close to that of the discharge mouth of the feed means above the floor 208.

Reference to FIGS. 10 and 11 will illustrate a further important characteristic of the present invention. Considering FIG. 10, the weighing pan 98 will be seen to present a flat floor portion 208 and it will also be noted that the interior of the weighing pan is smooth presenting no harbor points for product buildup. This feature in conjunction with the tilting action of the weighing pan for dumping purposes achieves certain results far superior to conventionally constructed weighing pan mechanisms or accumulators for the batch 200 of accumulated material. The tilting action during dumping causes the batch or pile 200 to discharge itself over the discharge edge 210 of the bottom wall 208 in a pouring or flowing action, naturally causing self-agitation or self-cleaning of the material in the pile assuring that it leaves the weighing pan and does not build up therewithin. Further, the very fact that the weighing pan is pivotally mounted leads to low inertia so that little effort is required to move the pan during dumping and this is enhanced materially by virtue of the fact that the weighing pan is simply an accumulator device and does not have nor does it require the extraneous gate mechanism for dumping the material such as is commonly used. The floor or bottom wall 208 may, if desired, be tipped backwardly to accommodate for the angle of repose of the material and also to accommodate for larger piles of material with the same size of weighing pan. Additionally, the weighing pan is extremely easy to mount so that it may be removed and or replaced rapidly and with little effort.

What is claimed is:

1. A net weighing device comprising, in combination,
   a supporting frame,
   a pair of uprights on said frame,
   a pair of weighing mechanisms disposed in side-by-side relation, each having an arm connected to a respective upright for vertical adjustment of the associated weighing mechanism, each weighing mechanism including a weighing pan and means for selectively dumping the weighing pan,
   a common hopper for receiving material dumped from said weighing pans,
   a pair of material feed devices having discharge end portions disposed above respective weighing pans, and means for preventing simultaneous dumping of said pans.

2. A net weighing device comprising, in combination, a weighing mechanism including a weighing pan, a material feed device having a discharge mouth disposed above said weighing pan for discharging material directly thereon,
a gate for selectively closing said discharge mouth of the material feed device,
means for closing said gate in response to a predetermined weight in said weighing pan less than the net weight desired,
and means for varying the vertical spacing between said discharge mouth and said weighing pan to minimize the quantity of flowing material between said discharge mouth and material piled on and supported by said weighing pan when said gate is closed.

3. A net weighing device comprising, in combination, a pair of material feed troughs having discharge mouths disposed in side-by-side relation,
   a pair of weighing mechanisms disposed in side-by-side relation and each including a weighing pan disposed below a respective feed trough discharge mouth,
   a single support post for each weighing mechanism and a support arm secured to each weighing mechanism for both pivotal and vertical adjustment on a respective support post.

4. A net weighing device comprising, in combination, a pair of material feed means having side-by-side discharge mouths,
   a weighing mechanism for each feed means, each weighing mechanism including a weighing pan disposed below a respective discharge mouth,
   means for tipping each weighing pan to dump material therefrom,
   a common hopper for receiving material from both of said weighing pans,
   and control means for effecting alternate tipping of said weighing pans.

5. The device as defined in claim 4 including gate means at each discharge mouth, said control means including mechanism for closing each gate means in response to the presence of a given weight of material in an associated weighing pan.

6. The device as defined in claim 5 including means for selectively positioning each weighing pan in predetermined spaced relation to an associated discharge mouth.

7. The device as defined in claim 4 including means for selectively positioning each weighing pan in predetermined spaced relation to an associated discharge mouth.

8. A net weighing device for dispensing batch quantities of particulate material in which each batch is of predetermined net weight, comprising, in combination,
   material feed means having a discharge mouth and gate means for selectively closing said discharge mouth,
   weighing means including a weight-sensitive member and a weighing pan pivotally mounted on said weight-sensitive member, said weighing pan being positioned below said discharge mouth so that a batch of material will pile thereon,
   means for pivotally moving said weighing pan to dump the pile of material therefrom,
   control means responsive to a predetermined weight of material on said weighing pan which is less than said predetermined net weight for closing said gate means,
   and means for varying the vertical spacing of said weighing pan with respect to said discharge mouth so that the apex of said pile of material is very close to said discharge mouth when said gate means is closed.

9. In a batch forming system of the type including a feed means for dispensing particulate material, and means for controlling said feed means to dispense particulate material in successive batches with dwell time periods of short duration between batches, the improvement comprising:
   a pan disposed below said feed means for receiving said successive batches of particulate material, said pan having a smooth and unobstructed bottom wall upon which the particulate material piles, said bottom wall having an end edge for discharging a batch of the particulate material,
   means mounting said pan about an axis for tilting said bottom wall to lower said end edge thereof whereby the particulate material batch may be discharged over said end edge,
   and means for tilting said pan about said axis during said dwell time between a batch-receiving position and a batch-dumping position, said bottom wall being inclined when in said batch-dumping position at an angle materially greater than the angle of repose of the particulate material whereby the particulate material flows in pouring fashion from the batch pile effectively to clean and completely evacuate the pan.

10. The batch forming system as defined in claim 9 wherein said pan also includes an end wall opposite said end edge and opposite side walls, said axis being parallel with said end edge.

References Cited

UNITED STATES PATENTS

| | | | |
|---|---|---|---|
| 2,638,305 | 5/1953 | Miller | 177—103 X |
| 3,168,224 | 2/1965 | Rios | 222—363 X |
| 3,204,821 | 9/1965 | Fann | 222—363 X |
| 3,254,729 | 6/1966 | Behlen | 177—103 |

RICHARD B. WILKINSON, *Primary Examiner.*

G. H. MILLER, JR., *Assistant Examiner.*

U.S. Cl. X.R.

177—260; 222—363